Patented Apr. 1, 1952

2,591,588

UNITED STATES PATENT OFFICE 2,591,588

FUNGICIDAL USE OF CERTAIN FURFURYL CARBANILATES

David T. Mowry, Dayton, Ohio, assignor to Monsanto Chemical Company, St. Louis, Mo., a corporation of Delaware No Drawing. Application February 25, 1950, Serial No. 146,393

5 Claims. (Cl. 167—33)

This invention relates to new and useful improvements in biological toxicants. The invention further relates to methods of treating plants and other organic materials which are subject to attack by fungi.

I have found that unusually effective fungicidal compositions are obtained when the active ingredient of such compositions is a compound having the general structure:

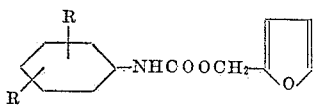

in which R is a member of the group consisting of hydrogen and chlorine.

Compounds having the above general formula are furfuryl carbanilate and the furfuryl mono- or dichlorocarbanilates such as furfuryl 4-chlorocarbanilate and its 2- and 3-isomers, furfuryl 2,4-dichlorocarbanilate, furfuryl 2,5-dichlorocarbanilate, etc. They are readily obtainable by reaction of phenyl isocyanate, mono-chlorophenyl isocyanates or dichlorophenyl isocyanates with furfuryl alcohol in known manner. The compounds are highly efficient for preventing and retarding fungus growth on plants, fruits, seeds, soils, fur, leather, cotton, wood and organic materials in general. They may be applied directly to the organic material which is to be treated, but because the furfuryl carbanilates are effective in extremely dilute concentrations, it is preferred to incorporate the present agents with a carrier or diluent.

Fungicidal dusts may be prepared by mixing the furfuryl carbanilates with dusting materials such as talc, clay, lime, bentonite, pumice, fuller's earth, etc. The furfuryl carbanilates are soluble in the usual organic solvents and may be used in solution, e. g., in ethanol solution as fungicidal sprays. Suspensions or dispersions of the carbanilates in a non-solvent such as water are advantageously employed in the treatment of plant foliage, textiles, leather and other materials with which it is not desirable to employ either a solid carrier or an organic solvent.

Fungicidal compositions comprising the present active ingredients may be applied only to the surface of the material to be treated as when treating foliage, furs, leather and other comparatively impregnable materials upon which fungus growth is to be prevented or retarded. In other cases, for example, when it is desired to protect seeds from soil microorganisms harmful to the seeds and plants, the furfuryl carbanilates, preferably incorporated with a solid carrier, may be mixed with the seed. For protection of fruits, seeds, plant tubers, etc. during storage, it may be advantageous to effect the treatment by employing baths comprising aqueous emulsions of the fungicides. Impregnation of textiles with the fungicide is also advantageously effected in baths.

The invention is further illustrated, but not limited, by the following examples:

Example 1

Furfuryl carbanilate was tested against *Aspergillus niger* using the following testing procedures:

Preliminary: Trommel's malt agar was poured into a Petri plate and allowed to harden. A circular section was cut from the center and into this cup was placed 0.1 gram of furfuryl carbanilate. The plate was then sprayed with a fresh aqueous spore suspension of *Aspergillus niger* and incubated at a temperature of 28° C. for five days. Inspection of the incubated plate at the end of that time showed no growth of *Aspergillus niger* within a 5 mm. zone.

Secondary: To 100 cc. of hot Trommel's malt agar was added 0.1 gram of furfuryl carbanilate. The agar was then whipped into an emulsion and poured into a cold plate and allowed to harden. 50 cc. of hot agar was added to 50 cc. of the above toxic agar to give a furfuryl carbanilate concentration of 0.05 per cent. To 10 cc. of the remaining toxic agar was added 90 cc. of agar to give a concentration of 0.005 per cent. Petri plates were poured from each of the two mixtures, i. e., that having a furfuryl carbanilate concentration of 0.05 per cent and that having an 0.005 per cent concentration. The plates were then sprayed with *Aspergillus niger* and incubated at a temperature of 28° C. for five days. At the end of that time inspection of the plates showed that on plates of both the 0.05 per cent and 0.005 per cent concentration the growth of *Aspergillus niger* was completely inhibited. The furfuryl chlorocarbanilates give similarly good results against this organism.

Example 2

In tests made on spores of the fungus *Sclerotinia fructiola*, 90 parts of furfuryl carbanilate per million parts of water gave an 85 per cent control of the fungus and 100 parts of the chemical per million parts of water gave a 100 per cent kill of the fungus.

Example 3

Tests of furfuryl carbanilate against a group of disease-producing fungi were made in vitro. Furfuryl carbanilate, at a 1:5,000 dilution, killed *Trychophyton interdigitale* (the "athlete's foot" fungus), and completely inhibited the growth of this organism at a 1:160,000 dilution.

*T. Rubrum* and *C. Albicans* were also killed by furfuryl carbanilate at 1:5,000 dilution, and the growth of these organisms was completely inhibited at dilution of 1:80,000 and 1:40,000, respectively.

Example 4

Toxicity tests against *Stemphyllium sarcinoformae* gave the following toxicity values for various concentrations of furfuryl carbanilate:

| Per Cent Toxicity | Concentration of furfuryl carbanilate, parts per million |
| --- | --- |
| 31 | 45 |
| 50 | 55 |
| 55 | 60 |
| 58 | 65 |
| 62 | 70 |
| 100 | 75 |

Example 5

Petri plate tests of furfuryl carbanilate against Pythium, conducted substantially according to the procedure employed in Example 1 showed no growth of the organism at a furfuryl carbanilate concentration of 200 parts per million and growth within a 4 mm. radius at a concentration of 100 parts per million.

Example 6

The effect of furfuryl carbanilate on peach "brown rot" was tested by treating peach chips with varying concentrations of furfuryl carbanilate. The use of an 0.065 per cent solution of furfuryl carbanilate was found to completely prevent the development of "brown rot."

What I claim is:

1. The method of protecting organic material susceptible to attack by fungi which comprises applying to said organic material, for the purpose of fungus-proofing, a fungicidal composition containing, as an essential active ingredient, a compound having the general formula

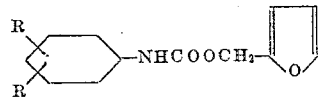

in which R is a member of the group consisting of hydrogen and chlorine.

2. The method of protecting organic material susceptible to attack by fungi which comprises applying to said organic material, for the purpose of fungus-proofing, a fungicidal composition containing, as an essential active ingredient, a compound have the general formula

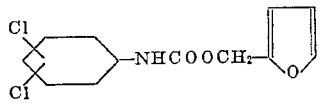

3. The method of protecting organic material susceptible to attack by fungi which comprises applying to said organic material, for the purpose of fungus-proofing, a fungicidal composition containing, as an essential active ingredient, furfuryl carbanilate.

4. The method of controlling fungi on living plants which comprises applying to said plants, for the purpose of fungus-proofing, a compound having the general formula

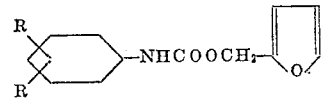

in which R is a member of the group consisting of hydrogen and chlorine.

5. The method of protecting peaches from brown rot which comprises contacting said peaches with a compound having the general formula

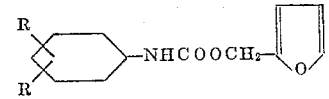

in which R is a member of the group consisting of hydrogen and chlorine.

DAVID T. MOWRY.

REFERENCES CITED

The following references are of record in the file of this patent:

Shriner and Fuson, "Identification of Organic Compounds" by J. Wiley and Sons (1940) p. 185.